United States Patent Office 3,546,128
Patented Dec. 8, 1970

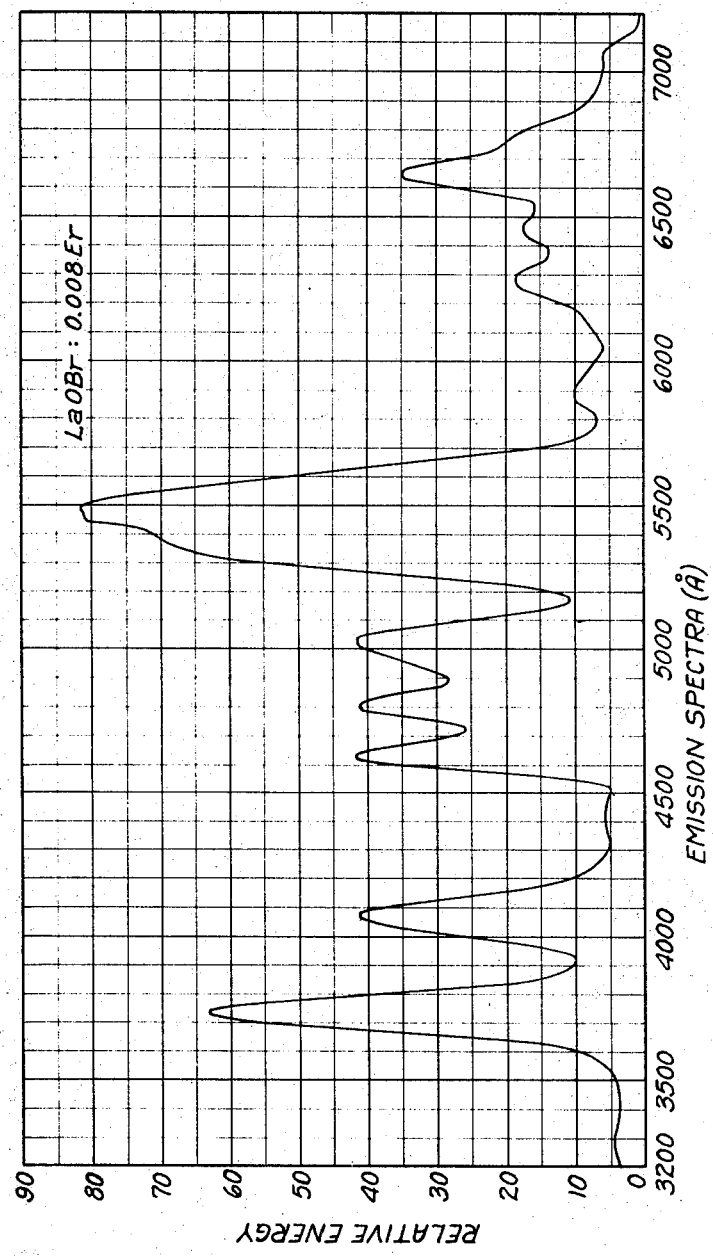

3,546,128
LANTHANUM AND GADOLINIUM OXYBROMIDE LUMINESCENT MATERIALS ACTIVATED WITH ERBIUM
Jacob G. Rabatin, Chardon, Ohio, assignor to General Electric Company, a corporation of New York
Filed Oct. 23, 1968, Ser. No. 769,860
Int. Cl. C09k 1/08
U.S. Cl. 252—301.4
5 Claims

ABSTRACT OF THE DISCLOSURE

Lanthanum and gadolinium oxybromides activated with erbium are found to be bright blue-green phosphors useful in X-ray image convertors, in lamps and in cathode ray tubes.

CROSS-REFERENCES TO RELATED APPLICATIONS

Processes for the production of luminescent materials of the present invention are described in more detail and are claimed in copending applications filed concurrently herewith identified as Fused Salt Process for Producing Rare Earth Oxyhalide and Oxide Luminescent Materials, Ser. No. 769,940, and Gaseous Reaction Process for the Production of Rare Earth Oxyhalide and Oxide Luminescent Materials, Ser. No. 780,928, both filed in the name of Jacob G. Rabatin.

Other copending applications filed concurrently herewith describe and claim related phosphors having different activators, and are identified as Lanthanum and Gadolinium Oxyhalide Luminescent Materials Activated With Terbium and X-Ray Image Convertors Utilizing the Same, Ser. No. 769,894, filed in the names of Jacob G. Rabatin and Robert A. Sieger, and Lanthanum and Gadolinium Oxyhalide Luminescent Materials Activated With Dysprosium, Ser. No. 769,922, filed in the name of Jacob G. Rabatin. All of these four copending applications are assigned to the assignee of the present application.

BACKGROUND OF THE INVENTION

The present invention relates to luminescent materials, and more particularly to luminescent materials categorized as rare earth oxybromides activated with erbium.

Even though many materials are known to be luminescent materials, it is not possible to predict whether certain new materials will produce light usefully under various excitations. The properties of such materials are controlled not only by the host material itself but also by complex optical and energy interactions of the small concentrations of activators with the host crystal. The ability of the host crystal to transmit the exciting energy, and the ability of the activator to absorb this energy and efficiently convert it into useful light which can be transmitted back out through the host crystal, are generally not subject to prediction.

Certain rare-earth oxyhalide phosphors are known, but new phosphors having different and improved characteristics including color and brightness are constantly being sought.

SUMMARY OF THE INVENTION

An object of the present invention is to provide new rare earth oxyhalide phosphors having different and improved luminescent characteristics including color and brightness.

The present invention in certain of its embodiments comprises luminescent material consisting essentially of erbium-activated oxybromides of at least one of gadolinium and lanthanum.

$Er^{+3}$ is present preferably in concentrations from about 0.1 to about 5.0 mole percent. One preferred embodiment of the invention contains about 0.8 mole percent erbium. Outside these limits, its effectiveness as an activator in these materials is considerably less than inside these limits. For optimum performance, the material should approach stoichiometry with erbium substituted for equivalent amounts of lanthanum or gadolinium.

This material has the formula:

$$LnOBr:Er^{+3}$$

wherein Ln is one or more of lanthanum or gadolinium.

BRIEF DESCRIPTION OF THE DRAWING

The sole figure of the drawing is a graph showing the emission spectrum of $LaOBr:0.008\ Er$ with relative energy plotted versus wavelength with cathode ray excitation.

DESCRIPTION OF THE PREFERRED EMBODIMENTS

Applicant has discovered that erbium-activated oxybromides of lanthanum and gadolinium are useful for the production of light.

These materials are useful as blue-green phosphors in lamps, in cathode ray tubes such as television tubes, and in X-ray applications such as image convertor tubes and film intensifier cassettes.

Satisfactory stoichiometric phosphors of the present invention can be made by either of at least two processes disclosed and claimed in the above-identified applications of Rabatin for fused salt and gaseous reaction processes.

For either process, it is desirable to start with rare earth oxides coprecipitated with the activator. Processes will be described below in terms of production of lanthanum oxybromide activated with erbium. Analogous processes are used to make gadolinium oxybromide, with suitable adjustments for atomic weight.

Preferably, the oxides of lanthanum and erbium are slurried in water, then dissolved by addition of $HNO_3$ and boiling for several minutes. The solution is then cooled to about 50 to 60° C., then an excess over the stoichiometric amount of solid oxalic acid, such as 120 to 200 percent, is added, and the reaction mixture is stirred for about 5 minutes. The mixture is then allowed to cool and the coprecipitated oxalate is removed by filtration without washing. The oxalate is dried at 100° C. in air and then fired to the oxide in air for one hour at about 1100° C. Fused silica boats and quartz tubes are used. This gives the mixed lanthanum oxide and erbium activator in a form suitable for use in production of the lanthanum oxybromide luminescent material.

More specifically, 13.04 grams of 99.99% $La_2O_3$ and 0.0306 grams $Er_2O_3$ were dissolved in $HNO_3$, coprecipitated as mixed oxalates, and fired to mixed oxides, as described above.

In one preferred process route, the mixed lanthanum oxide and erbium are blended with an alkali carbonate such as $Na_2CO_3$, and also with ammonium bromides. The mixture is blended and then fired for one hour in the temperature range of 400 to 500° C. to form LaOBr activated with erbium intimately mixed with NaBr. This mixture is crushed and blended and then fired for at least one hour at a temperature in the range of 800 to 1100° C. to recrystallize the lanthanum oxybromide luminescent material. This material is crushed, washed, filtered and dried and is then suitable for use as a well-crystallized luminescent material of the invention. Alternatively, alkali halide such as NaBr could have been added after formation of lanthanum oxybromide activated with erbium and before the recrystallization firing, instead of using the alkali carbonate in the first step. Other alkali salts which can be readily used include the carbonates and halides of potassium and lithium.

The other basic processing route for the production of luminescent materials of the invention involves blending the mixed lanthanum oxide and erbium oxide with ammonium bromide. The materials are blended and fired for one hour in a temperature range of 400 to 500° C. to form the lanthanum oxybromide activated with erbium. This material is then recrystallized by firing for at least one hour at a temperature in the range of 800 to 1200° C. in HBr mixed with $N_2$. Alternatively, the $NH_4Br$ may be omitted and the lanthanum oxide activated with erbium fired directly in the HBr-containing atmosphere for formation and recrystallization of the luminescent material in the same step.

More specifically, the last-described process may be performed without using ammonium halides by placing the 10 grams of the lanthanum oxide which is mixed with the erbium oxide as formed in the coprecipitation and firing reaction as described above in a quartz boat and treating it as follows. The quartz boat is introduced into a tube furnace of 1.5 inches inside diameter. The tube is flushed for 20 minutes with a flowing atmosphere consisting of 100 cc. per minutes of HBr and 100 cc. per minute of $N_2$. The typical firing conditions are one hour at 1000° C. At the end of the hour firing, the HBr flow is stopped, and the firing is continued for another 20 minutes as HBr is purged from the tube by $N_2$ flow. The boat is then removed to the cold zone and allowed to cool to room temperature with the nitrogen still flowing. By removing the HBr from the atmosphere before the reaction mixture is cooled, the formation of deleterious products is avoided. The resulting phosphor has the composition LaOBr:0.002 Er.

Although not all optimum process and application parameters were determined, a sample of LaOBr:0.008 Er under cathode-ray excitation gave a brightness of 13.2 foot-lamberts at a color of $x=257$, $y=451$ in the color units of the International Commission on Illumination, as compared with a control sample of ZnS:Ag at 25.0 foot-lamberts and $x=194$, $y=61$. The emission spectrum of this material shown in FIG. 1 is characteristic of the material.

The corresponding oxychlorides of lanthanum and gadolinium activated with erbium have been tried and found to be not efficient as luminescent materials.

What I claim as new and desire to secure by Letters Patent of the United States is:

1. Luminescent material consisting essentially of erbium-activated oxybromides of at least one of the rare earth metals lanthanum and gadolinium.
2. Luminescent material of claim 1 in which the erbium content is about between 0.1 and 5 mole percent.
3. Luminescent material of claim 2 in which the erbium content is about 0.8 mole percent.
4. Luminescent material of claim 1 in which the selected rare earth metal is lanthanum.
5. Luminescent material of claim 1 in which the selected rare earth metal is gadolinium.

References Cited
UNITED STATES PATENTS

| | | | |
|---|---|---|---|
| 2,729,605 | 1/1956 | Swindells | 252—301.4 |
| 3,403,279 | 9/1968 | Wanmaker et al. | 252—301.4 |

TOBIAS E. LEVOW, Primary Examiner

R. D. EDMONDS, Assistant Examiner